March 9, 1926.  
M. D. STALDER  
TROLLEY HARP  
Filed March 14, 1925
1,575,800
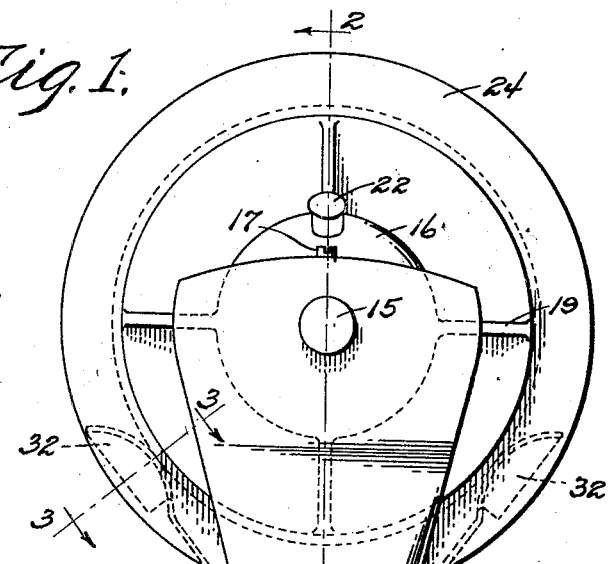
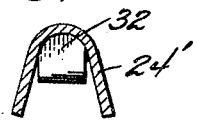
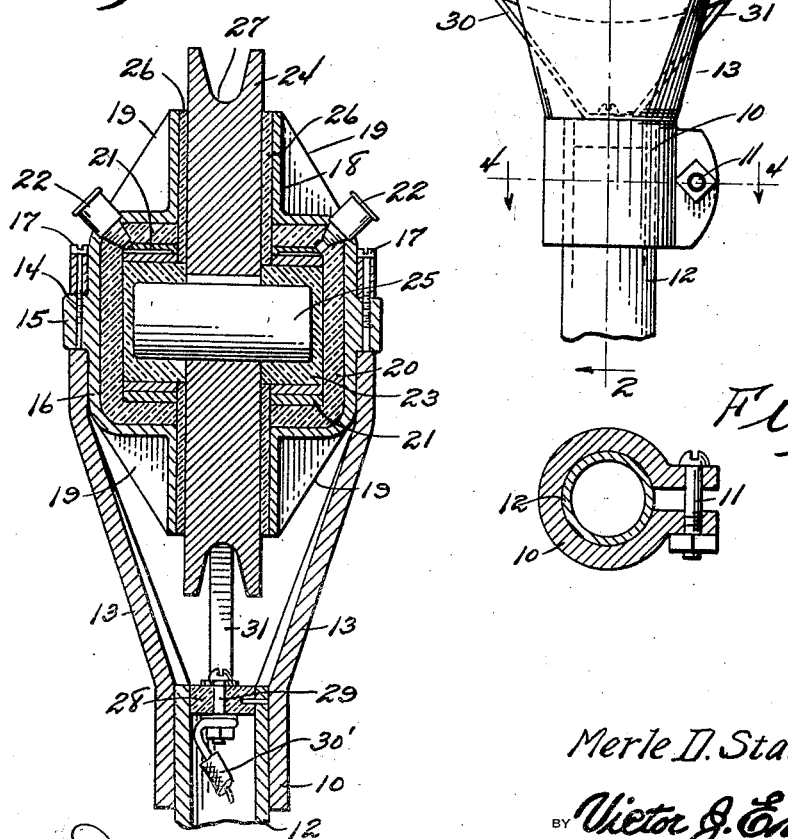
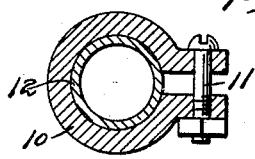
Merle D. Stalder  
INVENTOR  
BY Victor J. Evans  
ATTORNEY
WITNESS Patented Mar. 9, 1926.

1,575,800

UNITED STATES PATENT OFFICE.

MERLE D. STALDER, OF LINCOLN, NEBRASKA.

TROLLEY HARP.

Application filed March 14, 1925. Serial No. 15,562.

*To all whom it may concern:*

Be it known that I, MERLE D. STALDER, a citizen of the United States, residing at Lincoln, in the county of Lancaster and State of Nebraska, have invented new and useful Improvements in Trolley Harps, of which the following is a specification.

This invention relates to improvements in trolley harps and contemplates the provision of bushings therein which makes it possible for using oil as a lubricator instead of graphite bushings in order that the moving parts of the harp will be constantly oiled in their operation.

Another object of the invention is the provision of insulating means included in the harp in order that the trolley wheel and electric conducting means will be spaced in order that the oil will not interfere with any of the electric conducting means.

A further object of the invention is the provision of spring fingers included upon a trolley wheel and which have their upper end portions substantially offset and inwardly extending and including weighted end portions thereon which engage within opposite sides and within the groove of the trolley wheel in order that the current may be conducted to the wheel and thence to the trolley line in order that a complete circuit is assured through the harp per se.

With the above and other objects in view, the invention further includes the following novel features and details of construction, to be hereinafter more fully described, illustrated in the accompanying drawing and pointed out in the appended claims.

In the drawings:—

Figure 1 is a side elevation of the harp.

Figure 2 is a vertical section taken on line 2—2 of Figure 1.

Figure 3 is a section taken on line 3—3 of Figure 1 and showing the novel arrangement of the electric conducting means with the trolley wheel.

Figure 4 is a transverse section taken on line 4—4 of Figure 1 and showing the novel associating means of the harp with the trolley pole.

Referring to the drawing in detail, where- in like characters of reference denote corresponding parts, the reference character 10 indicates a hollow cylindrical clamp which has one side split and provides outwardly extending apertured ears thereon through which an adjusting bolt 11 extends, in order that the said clamp 10 may be adjustable with respect to the size of the upper end portion of a trolley pole 12. Extending upwardly and outwardly and parallel with respect to the clamp 10 is a pair of arms which have relatively enlarged upper portions aligned registering openings 14 in the enlarged upper portions thereof. Extending outwardly through the openings 14 provided in the upper enlarged portions of the arm 13 are trunnions 15 which extend therethrough from the outer sides of cup shaped members 16 arranged between the inner sides of the arms 13, and the said trunnions 15 are held rigidly with the arms 13 through the instrumentality of set screws or the like 16 provided in the upper portions of the arm 13. These cup shaped members 16 further include outwardly extending portions 18 with reinforcing ribs 19 extending in diametrically opposite directions upon the outer faces thereof and which reinforce or support and prevent breakage of the portions 18.

Positioned within the cup shaped portions of the cup shaped member 16 and upon the inner sides thereof are correspondingly shaped insulators 20 which may be formed of fibre or porcelain and which have their inner edges lying in the same plane with the outwardly extending portions 18 of the cup shaped members 16. Pairs of superimposed bushings 21 fitted within the cupped portions of the cup shaped insulator 20 have connected therewith cups 22 whereby oil may be applied between the bushings 21 in order that undue wear will not be exercised upon these bushings.

Also fitted within cup shaped insulators 20 are glass thimble insulators 23 which have their outer edges engaging the inner bushing fitted in the cup shape insulator 20 and adapted for rotation therewith, the inner end portions of the glass thimble insulators 23 extend inwardly an appreciable distance and further than the corresponding portions of the insulator 20 and the outwardly extending portions 18 of the cup shaped member 16.

A trolley wheel 24 is then placed between the glass thimble insulators 23 and which includes a shaft member 25 which has its opposite end portions bearingly mounted within the glass thimble insulators and which is keyed thereto.

In order to provide means for preventing the oil from the oil cups 22 and the bushings 21 from contacting with the glass thimble insulators 23 and trolley wheel 24 as well as the shaft member 25, there is provided a pair of dielectric disk members 26 which engage the outer side walls of the trolley wheel 24 and which space the outwardly extending portions 18 of the cup shaped member 16, the inner edges of the bushings 21 and insulator 20 from the outer sides of the trolley wheel 24, and having openings provided centrally thereof and which receive therein the inwardly extending portions of the glass thimble insulators 23 whereby oil is prevented from contacting with the trolley wheel and its shaft 25 in order that no short circuit will be caused from the association of the electricity and oil in the harp.

In order to electrically energize the trolley wheel 24, which of course will receive in the grooved portion 27 thereof provided in its periphery a trolley line, I provide a dielectric disk 28 which is fitted within the upper hollow portion of the trolley pole 12 and which includes a binding post 29 having its lower end connected to a suitable conducting wire 30 which leads to the operating mechanism of the car. The upper portion of the binding post 29 secures the intermediate portion of a spring strip which is substantially offset therefrom and which provides outwardly and upwardly extending arms 31 which are again inwardly offset and include weights 32 upon the upper ends thereof and which are adapted to be received in the grooved portion 27 in the trolley wheel 24 adjacent the lower end thereof whereby the electricity passing from a trolley line, not shown, will pass through the trolley wheel 24, the arm 31, binding post 29, and the conducting wires 30 in order that the car may be put in motion in either direction according to the desires of the engineer or motorman.

It will thus be seen from the foregoing description and accompanying drawing that this special type of trolley harp provides a very efficient form of harp which may effectively contact with a trolley line, not shown, which may conduct the electricity therefrom through the arms 31 and the conducting wire 30 without subjecting the working organisms thereof the graphite or oil owing to the relative arrangement and spacing of the insulators therein. It will also be noted that graphite bushings and the like are not utilized in the construction of this special type of trolley harp, but the ordinary and usual type of bushings are used and which are lubricated by the oil cups 22 and which will more effectively lubricate the bushings 21 than would graphite as the successive revolutions of the trolley wheel 24 and shaft 25 will tend to overheat the graphite and dry the same and when doing so will remove all the lubricant qualities thereof, wherein the oil will not be caused to lose its lubricating qualities owing to its subjection to the heat caused by the successive revolutions of the trolley wheel 24 and its shaft 25, whereby the said working organisms, that is, the bushings 21 and glass thimble insulators 23 will freely rotate owing to their partial submersion in oil.

The invention is susceptible of various changes in its form, proportions and minor details of construction and the right is herein reserved to make such changes as properly fall within the scope of the appended claims.

Having thus described my invention what is claimed is:

1. In a trolley harp, the combination of supporting means included upon the upper portion of a trolley pole, auxiliary supporting means included upon the supporting means, insulating means included within the auxiliary supporting means, bushings interposed between the insulating means, lubricating means connected with the bushings, insulating means interposed between the bushings, auxiliary supporting means and trolley wheel, and of electric conducting means having frictional engagement with the trolley wheel in order that the mechanism of a trolley car and the like may be energized.

2. A trolley harp of the character described comprising a split clamping member fitted upon the upper portion of a trolley pole and having upwardly and outwardly extending supporting arms provided thereon, a pair of substantially cup shaped supporting members having trunnions extending outwardly from the outer sides thereof, means included in the supporting arms for securing and holding the trunnions rigidly therewith, a substantially cup shaped insulator fitted within the cup shaped supporting member, pairs of bushings arranged in superimposed relation within the cup shaped insulator, each of the cup shaped insulators including glass thimble insulators included therein and spaced therefrom by the bushings, a shaft member having its end portions journaled within the glass thimble insulators, a trolley wheel keyed to the shaft, insulating disks spacing the bushings, cup shaped insulator and cup shaped supporting member on the trolley wheel, oiling means associated with the bushings, and spring tensioned contact members included in the upper portion of the trolley wheel and having their outer free end portions weighted and tensioned against and within the groove of the trolley wheels substantially as set forth.

In testimony whereof I affix my signature.

MERLE D. STALDER.